(12) United States Patent
Bennett (10) Patent No.: US 9,440,632 B2
(45) Date of Patent: Sep. 13, 2016

(54) METHOD, CONTROLLER AND SYSTEM FOR MONITORING BRAKE OPERATION

(71) Applicant: Mark A Bennett, LaGrange, OH (US)

(72) Inventor: Mark A Bennett, LaGrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/533,149

(22) Filed: Nov. 5, 2014

(65) Prior Publication Data

US 2016/0121870 A1    May 5, 2016

(51) Int. Cl.
| | | |
|---|---|---|
| *B60T 17/22* | (2006.01) | |
| *B60T 8/1755* | (2006.01) | |
| *B60T 8/176* | (2006.01) | |
| *B60T 7/04* | (2006.01) | |

(52) U.S. Cl.
CPC .............. *B60T 17/221* (2013.01); *B60T 7/042* (2013.01); *B60T 8/176* (2013.01); *B60T 8/1755* (2013.01); *B60T 2230/02* (2013.01); *B60T 2250/00* (2013.01); *B60T 2250/03* (2013.01); *B60T 2250/04* (2013.01)

(58) Field of Classification Search
CPC ..... B60T 8/1755; B60T 8/176; B60T 17/221
USPC .......................................................... 701/71
See application file for complete search history.

(56) References Cited

U.S. PATENT DOCUMENTS

| | | |
|---|---|---|
| 5,479,811 A | 1/1996 | Baumann et al. |
| 5,613,744 A | 3/1997 | Eslinger et al. |
| 5,935,186 A | 8/1999 | Yamazaki et al. |
| 6,002,248 A | 12/1999 | Binder |
| 6,167,354 A | 12/2000 | Maleki et al. |
| 6,278,361 B1 | 8/2001 | Magiawala et al. |
| 6,539,297 B2 | 3/2003 | Weiberle et al. |
| 6,680,672 B2 | 1/2004 | Borugian |
| 6,859,712 B2 | 2/2005 | Walenty et al. |
| 6,890,041 B1 * | 5/2005 | Ribbens .................. B64C 25/46 303/112 |
| 6,898,976 B2 | 5/2005 | Kamiya et al. |
| 6,988,026 B2 * | 1/2006 | Breed .................. G07C 5/0808 701/31.4 |

(Continued)

FOREIGN PATENT DOCUMENTS

DE        10243127 A1    3/2004

OTHER PUBLICATIONS

European Patent Office, "International Search Report and written Opinion of the International Searching Authority," Feb. 5, 2016, 11 pages, European Patent Office International Searching Authority, Rijswijk Netherlands.

*Primary Examiner* — Atul Trivedi (74) *Attorney, Agent, or Firm* — Cheryl L. Greenly; Brian E. Kondas; Eugene E. Clair (57) ABSTRACT

Various embodiments of an apparatus and method for monitoring a brake operation are disclosed. In accordance with one aspect, the brake operation monitoring system comprises a plurality of wheel speed sensors, a brake demand sensor; a plurality of stability sensors and a controller. The controller comprises wheel speed ports; a brake demand port; stability sensor ports; a communication port for receiving a plurality of messages; and a processing unit comprising control logic. The control logic receives a brake demand signal, at least one stability signal indicative of the cornering of the vehicle, and individual wheel speeds. The control logic calculates a master value to compare to individual wheel speed signals if the brake demand signal indicates no braking.

21 Claims, 6 Drawing Sheets

(56) References Cited

U.S. PATENT DOCUMENTS

| | | | |
|---|---|---|---|
| 7,503,436 B2 | 3/2009 | Matsuura et al. | |
| 7,712,588 B2 | 5/2010 | Caron | |
| 7,996,136 B2 | 8/2011 | Ruhnau | |
| 8,874,314 B2* | 10/2014 | Kobayashi | B60G 17/08 180/282 |
| 8,938,343 B2* | 1/2015 | Jensen | B60W 10/06 180/165 |
| 9,031,757 B2* | 5/2015 | Shimizu | B60T 8/17 701/70 |
| 9,043,111 B2* | 5/2015 | Dagenais | B60T 8/1706 701/70 |
| 2002/0138189 A1 | 9/2002 | Kubik | |
| 2003/0225499 A1* | 12/2003 | Holler | B60R 21/0132 701/71 |
| 2004/0030473 A1* | 2/2004 | Lu | B60G 17/0162 701/36 |
| 2004/0046448 A1 | 3/2004 | Brown | |
| 2004/0064246 A1* | 4/2004 | Lu | B60G 17/0162 701/124 |
| 2004/0068358 A1* | 4/2004 | Walenty | B60T 8/17616 701/71 |
| 2004/0220714 A1* | 11/2004 | Rudd, III | B60T 8/1703 701/71 |
| 2006/0144121 A1* | 7/2006 | Neubert | G01N 19/02 73/7 |
| 2007/0132311 A1* | 6/2007 | Giazotto | B60T 8/1703 303/126 |
| 2007/0222285 A1* | 9/2007 | Ribbens | B60T 8/1703 303/139 |
| 2009/0012687 A1* | 1/2009 | Maeda | B60T 8/1755 701/70 |
| 2009/0045672 A1* | 2/2009 | Nishino | B60T 7/042 303/113.3 |
| 2009/0186535 A1* | 7/2009 | Sullivan | B60F 3/0007 440/6 |
| 2009/0236905 A1* | 9/2009 | Maeda | B60T 8/1755 303/146 |
| 2013/0085650 A1* | 4/2013 | Nakamura | B60T 1/10 701/71 |
| 2013/0253793 A1* | 9/2013 | Lee | B60W 50/029 701/70 |
| 2014/0046565 A1 | 2/2014 | Maitlen | |
| 2015/0284021 A1* | 10/2015 | Singh | B60C 19/00 701/41 |

* cited by examiner

METHOD, CONTROLLER AND SYSTEM FOR MONITORING BRAKE OPERATION

BACKGROUND

The present invention relates to an apparatus and method for monitoring brake operation on a commercial vehicle. Commercial vehicles, such as tractor-trailers and buses, are generally equipped with an anti-lock braking or stability control system. These systems control vehicle braking in the event of wheel slip or instability of the vehicle by monitoring a variety of sensors on the vehicle. Some vehicles are equipped with brake wear sensing devices that indicate the wear of each brake lining. A warning is typically given to the operator when the wear exceeds a predetermined threshold. However, the brake wear sensors do not measure brake drag, which can occur when the brake shoe or brake pads are not completely released at the completion of a service brake application. The brake wear sensors do not measure an underperforming brake, which can occur when the brake at a particular wheel end does not apply as quickly or as fully as the other wheel end brakes on the vehicle. Information from the wear devices and sensors associated with the stability control system are typically evaluated instantaneously during vehicle operation, which does not indicate any long-term trends in the brake operation. These brake wear systems are typically separate from the anti-lock braking or stability control systems so that any information learned from the brake wear system is not used to improve braking performance.

SUMMARY

Various aspects of a brake operation monitoring system are disclosed. In accordance with one aspect, the brake operation monitoring system comprises a plurality of wheel speed sensors, each of the plurality of wheel speed sensors correlated with a specific wheel location; a brake demand sensor; a plurality of stability sensors for receiving stability signals; and a controller. The controller comprises a plurality of wheel speed inputs for receiving individual wheel speed sensor signals; a brake demand input; a plurality of stability sensor inputs for receiving stability signals; a communication port for transmitting and receiving a plurality of messages; and a processing unit comprising control logic, wherein the processing unit is in communication with the plurality of wheel speed inputs and the communication port. The control logic is capable of receiving a brake demand signal indicative of a brake demand; receiving at least one stability signal indicative of the cornering of the vehicle; receiving signals indicative of individual wheel speeds; determining a master wheel speed signal from the individual wheel speed signals if the brake demand signal indicates no braking; determining a baseline calibration of the individual wheel speed signals based on the difference of each wheel speed signal from the master wheel speed signal if the at least one stability signal indicates no cornering; and storing the differences in the processing unit.

In accordance with another aspect, a method for monitoring brake operation on a vehicle comprises receiving a brake demand signal indicative of a brake demand; receiving at least one stability signal indicative of the stability of the vehicle; receiving a plurality of wheel speed signals from individual wheel speed sensors associated with individual wheel ends of the vehicle; determining the velocity of the vehicle is at least as great as a predetermined minimum velocity; calculating a master value from the plurality of wheel speed signals wherein the brake demand signal indicates no braking and wherein the at least one stability signal indicates no cornering; determining a baseline calibration of each of the individual wheel speed signals; and storing the baseline calibration in the processing unit.

In accordance with another aspect, a controller for detecting a brake system deficiency of a vehicle comprises a plurality of wheel speed inputs for receiving individual wheel speed sensor signals, each of the plurality of wheel speed inputs correlated with a specific wheel location; a brake demand input; a plurality of stability sensor inputs for receiving stability signals; a communication port for transmitting and receiving a plurality of messages; and a processing unit comprising control logic, wherein the processing unit is in communication with the plurality of wheel speed inputs and the communication port. The control logic is capable of receiving a brake demand signal indicative of a brake demand; receiving at least one stability signal indicative of the cornering of the vehicle; receiving signals indicative of individual wheel speeds; calculating a master value if the brake demand signal indicates no braking; determining a baseline calibration of the individual wheel speed signals based on the difference of each wheel speed signal from the master value if the at least one stability signal indicates no cornering; and storing the differences in the processing unit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
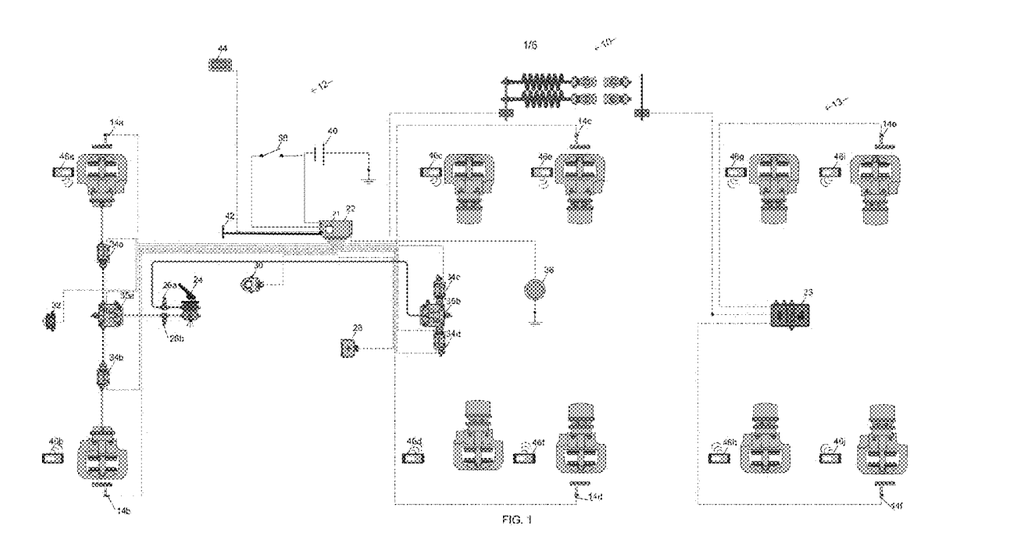
FIG. 1 illustrates a schematic representation of a vehicle having a tractor portion and a trailer portion, according to an example of the present invention.

With reference to FIG. 1, a vehicle 10 with a tractor portion 12 and a trailer portion 13 is illustrated, according to an example of the present invention. Both the tractor portion 12 and the trailer portion 13 can be equipped with the brake monitoring function, or only one portion may be equipped with the brake monitoring function.

The tractor portion 12 of vehicle 10 generally has at least six wheel locations. The wheel locations of the tractor portion 12 include right front, right mid, right rear, left front, left mid and left rear. The trailer portion 13 of vehicle 10 generally has at least four wheel locations. The wheel locations of the trailer portion 13 include right front, right rear, left front and left rear.

In the example shown in FIG. 1, the tractor portion 12 of vehicle 10 includes four wheel speed sensors 14a, 14b, 14e, 14d. The trailer portion 13 of the vehicle 10 includes two wheel speed sensors 14e, 14f. Each wheel speed sensor 14a, 14b, 14e, 14d, 14e, 14f generates a wheel speed signal fir the particular wheel location when the tires are rotating. There can be greater than six or fewer than six wheel speed sensors on the vehicle 10.

The tractor portion 12 of vehicle 10 includes a brake control device 34a, 34b, 34e, 34d at each wheel location. Each brake control device 34a, 34b, 34e, 34d is pneumatically connected to control valves 35a, 35b and used for anti-lock braking and/or stability control. In other examples, there can be a single brake control device per vehicle axle or a brake control device for each wheel location. In one example, the brake control devices 34a, 34b, 34e, 34d are anti lock brake control modulators.

The tractor portion 12 of vehicle 10 includes a brake pedal 24. Two brake demand sensors 26a, 26b are mounted on or proximate to the brake pedal 24. In one example, the brake demand sensors 26a, 26b are pressure sensors.

Since the tractor portion 12 of the vehicle 10 is equipped with a stability control system, such as the Bendix® ESP® Full Stability System, the tractor portion 12 includes a combination lateral acceleration sensor and yaw rate sensor 26. The tractor portion 12 of the vehicle 10 includes a steering angle sensor 30, which is also used in stability control of the vehicle 10.

The tractor portion 12 of the vehicle 10 includes a radar sensor 32 for use in an adaptive cruise with braking system, such as the Bendix® Wingman® Advanced ACB. The information transmitted by the radar sensor 48 typically includes automated deceleration requests. A deceleration signal is created in response to the automated deceleration request when the ACB system determines the vehicle 10 needs to decelerate in order to maintain a certain following distance between the vehicle 10 and a target vehicle.

The tractor portion 12 of the vehicle 10 includes a battery 40. The battery 40, or battery pack, powers the entire vehicle 10. The tractor portion 12 of the vehicle 10 includes an ignition switch 38. The ignition switch 38 provides power whenever the driver has engaged the ignition of the vehicle 10.

The tractor portion 12 of the vehicle 10 includes a stop lamp 36. Power is transmitted through a stop lamp switch (not shown) to the light the stop lamp 36 whenever the driver depresses the brake pedal 24 and an approximate brake pressure of six pounds per square inch (psi) is reached or exceeded. Power is also provided to the trailer portion 13 of the vehicle 10 at the same time the stop lamp switch on the tractor is activated.

The tractor portion 12 of the vehicle 10 includes a serial communications bus 42. The serial communications bus 42 carries messages in an SAE J1939 format or a proprietary format among controllers connected to the serial communications bus 42 on the tractor portion 12.

The tractor portion 12 of the vehicle 10 includes a display 44 so that the driver can see the status of the vehicle braking system, including the brake monitoring operation. The display 44 may be connected to the serial communications bus 42 or directly to a tractor controller 22.

Each wheel location on tractor portion 12 includes a tire sensor, illustrated by tire sensors 46a, 46b, 46c, 46d, 46e, 46f. Each wheel location on trailer portion 13 includes a tire sensor, illustrated by tire sensors 46g, 46h, 46i, 46j. The tire sensors 46a, 46b, 46c, 46d, 46e, 46f, 46g, 46h, 46i, 46j monitor tire characteristic information, such as the tire pressure, tire temperature, sensor battery voltage, vehicle load and tire vibration. The tire sensors can include an accelerometer or centrifugal switch to indicate a motion value, such as rotation of the wheel. The tire sensors 46a, 46b, 46c, 46d, 46e, 46i, 46g, 46h, 46i, 46j can be tire pressure sensors used in the Smartire® Tire Pressure Monitoring System from Bendix Commercial Vehicle Systems LLC, of Elyria, Ohio, for example. Each tire sensor 46a, 46b, 46c, 46d, 46e, 46i, 46g, 46h, 46i, 46j comprises a wireless transmitter that periodically transmits signals containing the tire related information and a unique sensor identification code (ID) in a selected data transmission format.

The tractor portion 12 of vehicle 10 includes a tractor controller 22. The tractor controller 22 can be a stand-alone controller or include functionality for controlling the anti-lock braking, stability control, or active cruise control with braking system, in addition to brake operation monitoring.

The trailer portion 13 of vehicle 10 includes a trailer controller 23. The trailer controller 23 can be a stand-alone controller or include functionality for controlling the anti-lock braking or stability control system in addition to brake operation monitoring. The trailer controller 23 receives power from the tractor portion 12 via a battery connection or via the connection for powering the stop lamp 36.

The tractor controller 22 includes control logic 21 for performing the brake monitoring function. The control logic 21 may also perform anti-lock braking, stability control or active cruise with braking functions. The control logic 21 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 21. Values determined during operation of the brake monitoring methods may also be stored in the memory of the control logic 21.

The tractor controller 22 communicates with the serial communications bus 42. The tractor controller 22 communicates with the display 44. The display 44 informs the vehicle operator of any issues with the braking system that may be determined by the tractor controller 22. The tractor controller 22 may also send information regarding brake operation to the serial communications bus 42.

The tractor controller 22 receives a signal indicative of brake demand. The brake demand signal may come directly from the pressure sensors 26a, 26b or from another source in the service braking circuit. The tractor controller 22 includes at least one input for receiving signals indicative of the stability of the vehicle 10. The tractor controller 22 may receive yaw rate signals, lateral acceleration signals and/or steering angle sensor signals. The tractor controller 22 includes individual inputs for the wheel speed sensor signals from the wheel speed sensors 14a, 14b, 14c, 14d. Each of these signals may be directly connected to the tractor controller 22 as shown in FIG. 1 or may be received via other means, such as via the serial communications bus 42.

The tractor controller 22 is connected to the battery 40 for powering the tractor controller 22. The tractor controller 22 also includes input from the ignition switch 38. The tractor controller 22 receives power at the ignition switch input only when the ignition switch 38 is engaged.

The tractor controller 22 communicates with the brake control devices 34a, 34b, 34c, 34d and control valves 35a, 35b. The brake control devices 34a, 34b, 34c, 34d receive an air supply from either an application of the brake pedal 24 by the driver or from the control valves 35a, 35b. The control valves 35a, 35b are independently controlled by the tractor controller 22 to provide supply pressure independent of the driver's brake application.

The control logic 21 of the tractor controller 22 uses the each of the sensors and devices described above to monitor brake operation at a wheel end. For example, brake drag can occur when the pressure applied to a brake is not fully released at the end of the service brake application. A cause of brake drag includes a misaligned caliper that holds the brake pad in contact with the rotor at the end of the service brake application. Brake drag is monitored after a braking event while the vehicle 10 is moving. The control logic 21 of the tractor controller 22 also identifies an under-performing brake at a wheel end. An under-performing brake is one that does not apply the brake to the same pressure level as the other wheel end brakes. Some causes of under-performing brakes include out of adjustment brakes or over worn brake pads. Under-performing brakes are monitored during a braking event.

A series of flowcharts for implementing methods of monitoring brake operation according to examples of the present invention are shown in FIGS. 2-6.

Figure 2:
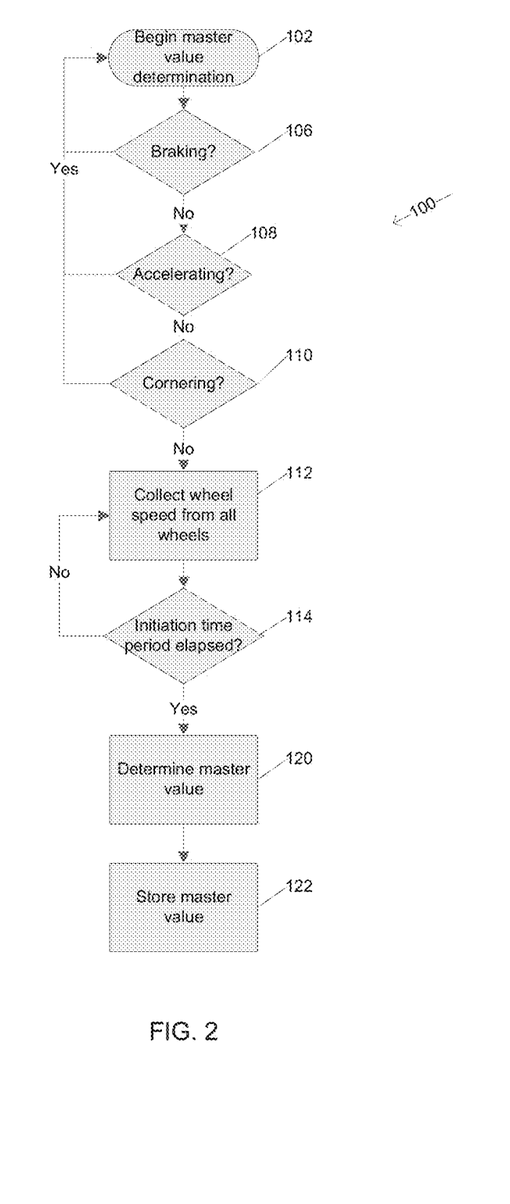
FIG. 2 illustrates a method of implementing the brake monitoring system, according to an example of the present invention.

In FIG. 2, the master value determination method 100 is initiated in step 102. The control logic 21 determines if the vehicle 10 is braking in step 106 by determining if there is a brake demand signal from the pressure sensors 26a, 26b. If there is no brake demand signal, the method 100 proceeds to step 108. If there is a brake demand signal, the method 100 returns to step 102. In step 108, the control logic 21 determines if the vehicle 10 is accelerating, either by using the signals from the wheel speed sensors 14a, 14b, 14c, 14d or other indicators of acceleration, such as acceleration messages on the serial communications bus 42. If the vehicle 10 is not accelerating, the method 100 continues to step 110. If the vehicle 10 is accelerating, the method 100 returns to step 102. In step 110, the control logic 21 determines if the vehicle 10 is cornering, either by using the signal from the steering angle sensor 30 or other indicators of cornering. Cornering includes hard left and right turns, as well as turning to exit a highway via an off ramp. A change in the steering angle due to a normal lane change on the highway would not be considered cornering. If the vehicle 10 is not cornering, the method 100 continues to step 112. If the vehicle 10 is cornering, the method 100 returns to step 102.

In step 112, the control logic 21 receives each of the wheel speed signals from wheel speed sensors 14a, 14b, 14c, 14d. In step 114, the wheel speed signals are monitored for an initiation time period. In one example, the initiation time period is about thirty (30) seconds. In another example, the initiation time period is about sixty (60) seconds. If the initiation time period has not elapsed, the method 100 continues to collect the wheel speed signals as in step 112.

Once the initiation time period has elapsed, the control logic 21 determines a master value in step 120. The master value will be compared individually to each wheel speed signal in later steps. A master value can be determined in multiple different manners. In one example, the master value is set as the mode, or most frequently occurring, wheel speed signal. In another example, the master value is the mean, or average, of all of the wheel speed signals. In another example, the master value is set to match the two closest wheel speed signals. In another example, the master value is the vehicle velocity estimated by the tractor controller 22 using the wheel speed signals. In another example, the vehicle velocity is received from another controller on the vehicle 10, such as an engine controller, a radar controller or a separate anti-lock braking system controller and received by the tractor controller 22 on the serial communications bus 42. In another example, the master value is set as the wheel speed signal equal to or nearly equal to the overall vehicle velocity. Once the control logic 21 determines the master value, the master value is stored in the memory portion of the control logic 21 in step 122. Once the master value is stored in step 122, the brake monitoring operation can move sequentially into any one of short-term monitoring method 140, drag monitoring method 180, underperforming brake monitoring method 220, and long-term monitoring method 240 or all monitoring methods 140, 180, 220, 240 can run simultaneously.

Figure 3:
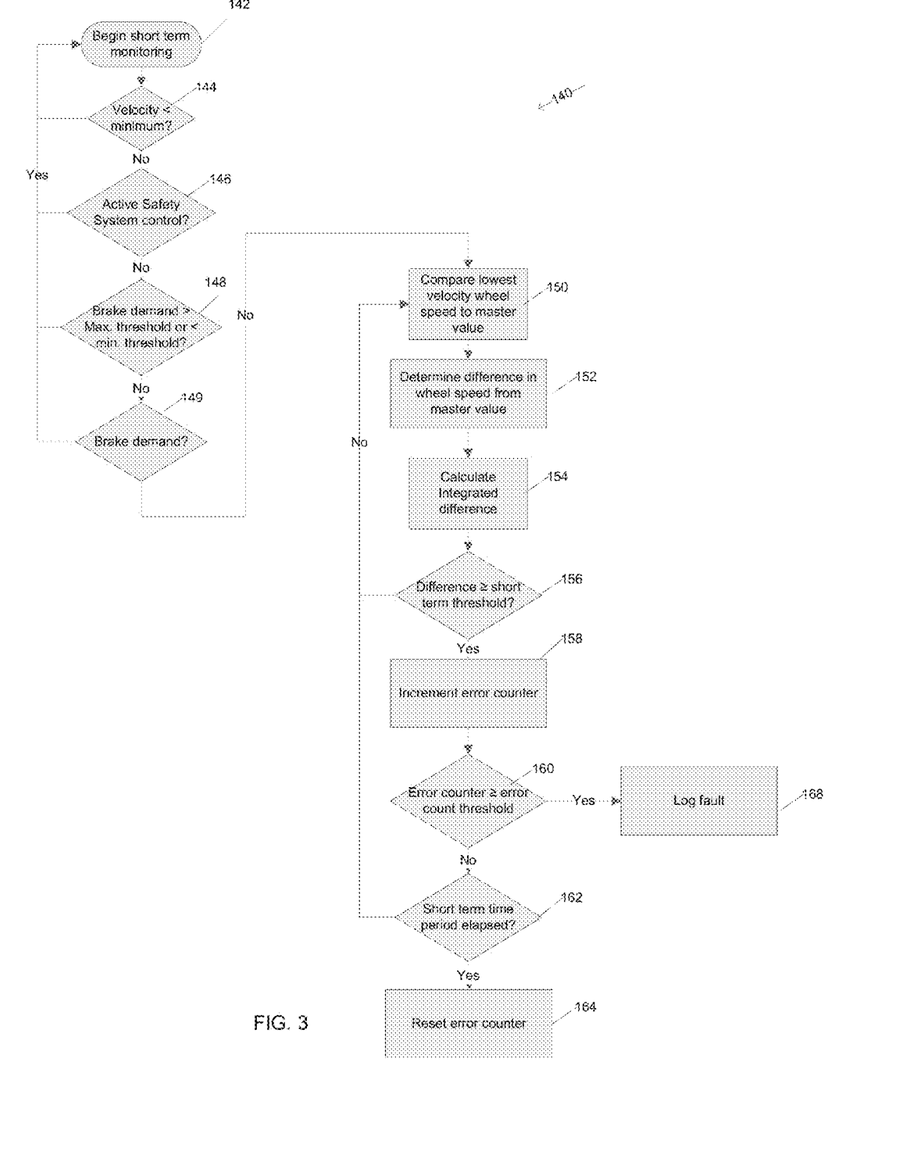
FIG. 3 illustrates another method of implementing the brake monitoring system, according to an example of the present invention.

In an example as shown in FIG. 3, a short-term monitoring method 140 is shown. In step 142, the short-term monitoring method 140 is initiated. In step 144, the velocity of the vehicle 10 is monitored to determine if the velocity is less than a predetermined minimum velocity. In one example, the predetermined minimum velocity is five (5) miles per hour and in another example, the predetermined minimum velocity is ten (10) miles per hour. If the vehicle 10 is moving equal to or greater than the predetermined velocity, the method 140 continues to step 146. If the velocity of the vehicle 10 is less than the predetermined velocity, the method returns to step 142.

In step 146, the control logic 21 determines if the vehicle 10 is being controlled by an active safety system, such as a stability control or active cruise with braking system. An active safety system will automatically control the vehicle brakes, such as with stability control interventions or active cruise with braking interventions, if the vehicle 10 is being controlled by an active safety system, the method 140 returns to step 142. If the vehicle is not being controlled by an active safety system, the method 140 continues to step 148.

In step 148, the control logic 21 determines if the brake demand signal from the pressure sensors 26a, 26b is greater than a predetermined maximum braking threshold or less than a predetermined minimum braking threshold. In one example, the predetermined minimum braking threshold is about ten pounds per square inch (10 psi) and the predetermined maximum predetermined braking threshold is about thirty pounds per square inch (30 psi). If the brake demand signal is greater than the predetermined maximum braking threshold or less than the predetermined minimum braking threshold, the method 140 returns to step 142. If the brake demand signal is less than or equal to the predetermined maximum braking threshold or greater than or equal to the predetermined minimum braking threshold, the method 140 continues to step 149. In this manner, the control logic 21 determines that the brakes have been applied on the vehicle by the driver in an attempt to decelerate the vehicle in a normal manner.

In step 149, the brake demand signal is monitored to determine if brake demand is still present. If the brake demand is still present, the method 140 returns to step 142. If the brake demand is not present, the method 140 continues to step 150.

In step 150, the control logic 21 selects the lowest velocity wheel speed signal of the individual wheel speed sensors 14a, 14b, 14c, 14d to compare to the master value, as determined by method 100. The master value may be determined anew each time the short-term monitoring method 140 is initiated. The lowest velocity wheel speed signal is selected as it is more likely to be wheel speed sensor on the wheel end with a potential brake drag issue. In step 152, the control logic 21 determines the difference of the lowest velocity wheel speed sensor signal from the master value. In step 154, the difference of the lowest velocity wheel speed signal from the master value is integrated, meaning that the difference is accumulated over time. For example, to calculate an integrated difference, velocity $V_1$ at time $t_1$ is subtracted from the velocity $V_2$ at time $t_2$ and the difference is divided by the difference in time $t_2-t_1$ to obtain an integrated velocity $IV_1$. The integrated velocity $IV_2$ is then subtracted from the velocity $V_3$ at time $t_3$ and the difference is divided by the difference in t3–t2, and so on. In step 156, the integrated difference is compared to a short-term threshold. If the difference is equal to or greater than the short-term threshold, the method 140 continues to step 158. If the difference is less than the short-term threshold, the method 140 returns to step 150. In one example, the short-term threshold is between 3 and 10. In another example, the short-term threshold is 4.

In step 158, a brake drag error counter is incremented by one increment when the integrated difference of the lowest velocity wheel speed signal is greater than or equal to the short-term threshold.

In step 160, the brake drag error counter is compared to an error count threshold. If the accumulated brake drag error counter is less than the error count threshold, the method 140 continues to step 162. If the brake drag error counter is greater than or equal to the error count threshold, the method 140 continues to step 168 and a short-term fault is logged by the control logic 21. In one example, the error count threshold is between 3 and 10. In another example, the error count threshold is 5.

If the control logic 21 logs a short-term brake drag fault, the control logic 21 can send an indicator signal to the display 44 to indicate to the driver that there is likely a brake drag occurring at the wheel end with the fault.

If the brake drag error counter has not equaled or exceeded the error count threshold in step 160, the control logic 21 continues to step 162 and determines if short-term time period from the initiation of the short-term monitoring in step 142 has elapsed. If the short-term time period has elapsed, the brake drag error counter is reset to zero in step 164. This reset prevents noise on a wheel speed signal from causing errors in the measurement or integration. If the short-term time period has not elapsed, the method 140 returns directly to step 150 where the comparison of the lowest velocity wheel speed signal to the master value begins anew. In one example, the short-term time period ranges from about five (5) minutes to about ten (10) minutes.

Figure 4:
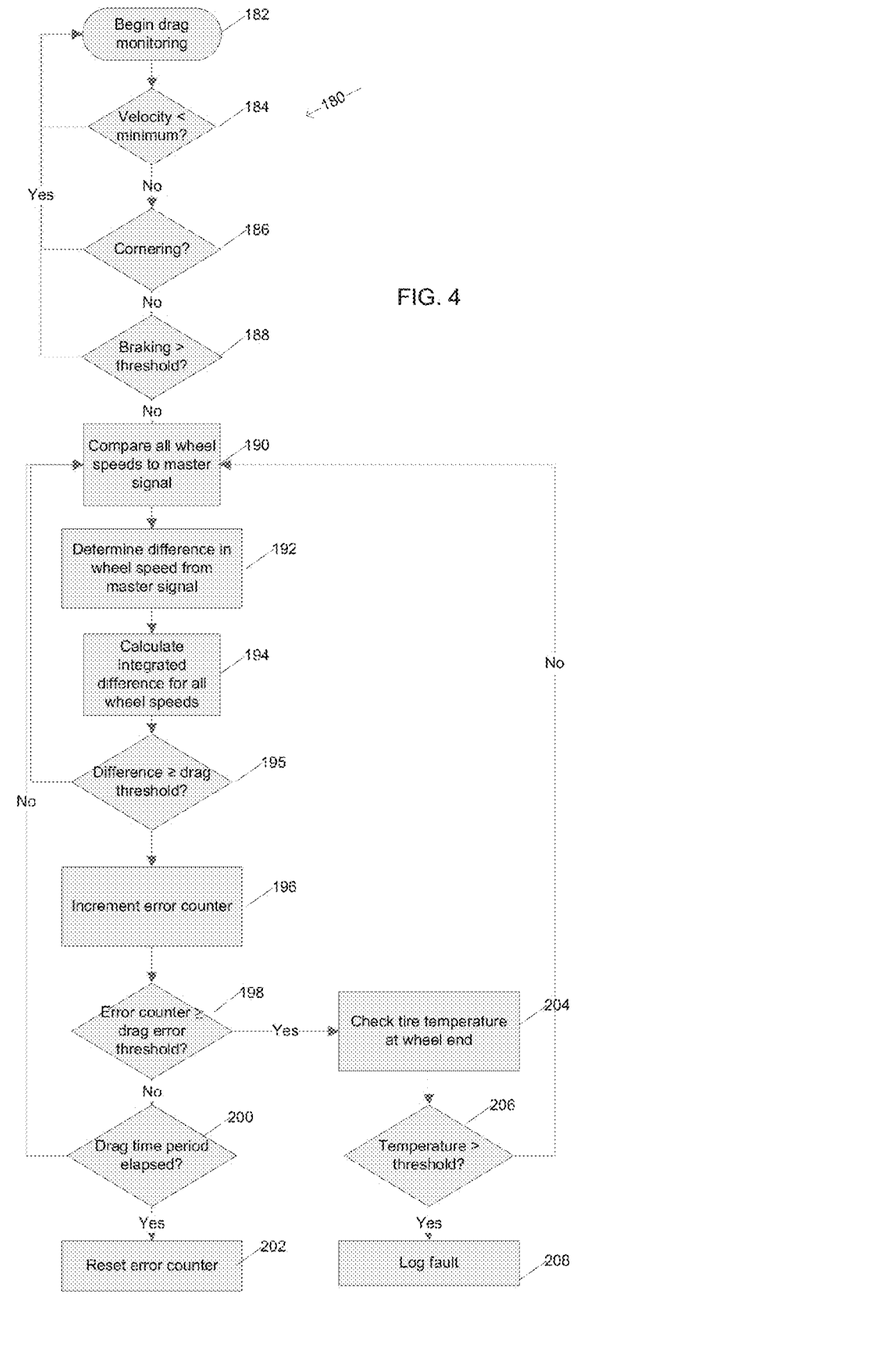
FIG. 4 illustrates another method of implementing the brake monitoring system, according to an example of the present invention.

In the example in FIG. 4, a drag monitoring method 180 is shown. In step 182, the drag monitoring method 180 is initiated. In step 184, the control logic 21 monitors the velocity of the vehicle 10 to determine if the velocity is greater than or equal to a predetermined minimum velocity. In one example, the predetermined minimum velocity is five miles per hour. In another example, the predetermined minimum velocity is ten miles per hour. If the vehicle 10 is moving greater than or equal to the predetermined minimum velocity, the method 180 continues to step 186. If the velocity of the vehicle 10 is less than the predetermined minimum velocity, the method 180 returns to step 182.

In step 186, the control logic 21 determines if the vehicle 10 is cornering, either by using the signal from the steering angle sensor 30 or other indicators of cornering. If the vehicle 10 is not cornering, the method 180 continues to step 188. If the vehicle 10 is cornering, the method 180 returns to step 182.

In step 188, the control logic 21 determines if the brake demand signal is less than a predetermined maximum braking threshold. In one example, the predetermined maximum braking threshold is about twenty pounds per square inch. In another example, the predetermined maximum braking threshold is about thirty pounds per square inch. If the brake demand signal is less than the predetermined braking threshold, the method 180 continues to step 190. If the brake demand signal is greater than or equal to the predetermined maximum braking threshold, the method returns to step 182.

In step 190, the control logic 21 compares all of the wheel speed signals of wheel speed sensors 14*a*, 14*b*, 14*c*, 14*d* individually to the master value. In step 192, the control logic 21 determines the difference of each wheel speed sensor signal from the master value. The master value may be determined anew each time the drag monitoring method 180 is initiated.

In step 194, in order to determine if a brake drag exists at any wheel, the difference of each wheel speed signal from the master value is integrated, meaning that the difference is accumulated over time, similar to step 154 of the short-term monitoring method 140. In step 195, the integrated difference of each of the wheel speed sensor signals is compared to a drag threshold. If the difference is equal to or greater than the drag threshold, the method 180 continues to step 196. If the difference is less than the drag threshold, the method 180 returns to step 190. In one example, the drag threshold is between 8 and 15. In another example, the drag threshold is 10.

In step 196, the drag error counter is incremented. The drag error counter is not the same as the brake drag error counter of the short-term monitoring method 140. In step 198, the drag error counter is compared against a drag error threshold. If the drag error counter is less than the drag error threshold, the method 180 continues to step 200. If the drag error counter is greater than or equal to the drag error threshold, the method 180 continues to step 204.

The drag monitoring method 180 can cross check information with a tire sensors 46*a*, 46*b*, 46*c*, 46*d*, 46*e*, 46*f* on an individual wheel end. In step 204, the tire temperature is analyzed from the tire sensor in the wheel end that has exceeded the drag error threshold. In step 206, the tire temperature is compared to a threshold temperature. If the tire temperature exceeds the threshold temperature, a drag fault is logged in step 208. Because a dragging brake can cause high temperatures at a wheel end, the high temperature will be captured by a tire sensor in the tire at that wheel end as well. Information about tire temperature can be exchanged over the serial communication bus 42 or the tractor controller 22 can receive the tire pressure information directly from tire sensors 46*a*, 46*b*, 46*c*, 46*d*, 46*e*, 46*f*.

If the control logic 21 logs a drag fault, the control logic 21 may indicate to the driver via indicator 44 that there is brake drag at the wheel end with the higher than drag threshold error counter and higher than temperature threshold at the wheel end.

If the brake drag error counter has not equaled or exceeded the drag threshold in step 198, the control logic 21 continues to step 200 and determines if drag time period from the initiation of the drag monitoring step 190 has elapsed. If drag time period has elapsed, the error counter is reset to zero in step 202. This function compensates for noise on any wheel speed signal that may cause errors in the measurement or integration. If the drag time period has not elapsed, the method 180 returns directly to step 190 to continue to compare all wheel speed signals to the master value. In one example, the drag time period ranges from about ten (10) minutes to about fifteen (15) minutes.

Once a short-term fault is determined using method 140 or a drag fault is determined in method 180, the wheel end with brake drag can be given less brake pressure by the tractor controller 22 via the brake control device 34a, 34b, 34c, 34d in order to prevent the wheel end from becoming overbraked and affecting the stability of the vehicle.

Figure 5:
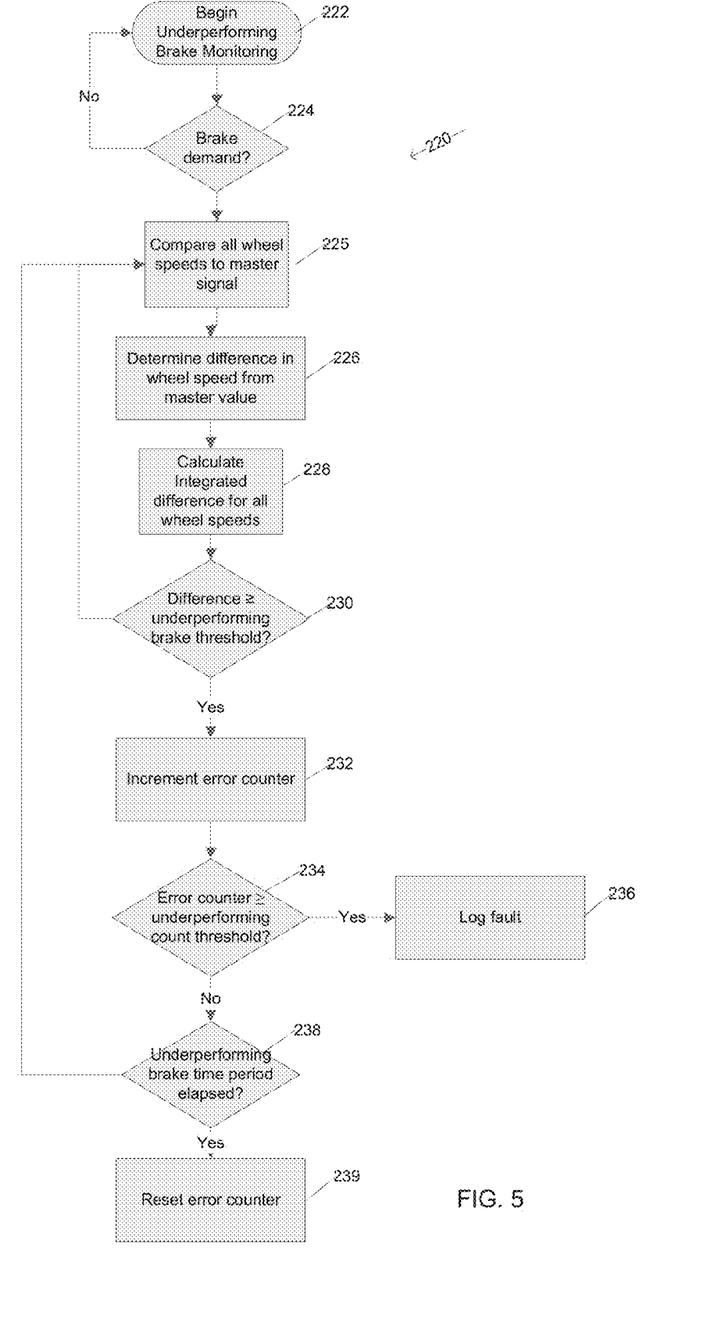
FIG. 5 illustrates another method of implementing the brake monitoring system, according to an example of the present invention.

In another example shown in FIG. 5, an underperforming brake monitoring method 220 is shown. In step 222, the underperforming brake monitoring method 220 is initiated.

In step 224, the brake demand signal is monitored to determine if a brake demand is present. If the brake demand is not present, the method 220 returns to step 222. If the brake demand is present, the method 220 continues to step 224.

In step 224, the control logic 21 compares all of the wheel speed signals of wheel speed sensors 14a, 14b, 14c, 14d individually to the master value. In step 226, the control logic 21 determines the difference of each wheel speed sensor signal from the master value. The master value may be determined anew each time the underperforming brake monitoring method 220 is initiated.

In step 228, in order to determine if an underperforming brake exists at any wheel, an integrated difference of each wheel speed signal from the master value is calculated, meaning that the difference is accumulated over time. In step 230, the integrated difference of each wheel speed sensor signal is compared to an underperforming brake threshold. If the difference is equal to or greater than the underperforming brake threshold, the method 220 continues to step 232. If the difference is less than the underperforming brake threshold, the method 220 returns to step 222. In one example, the underperforming brake threshold is between 12 and 20. In another example, the underperforming brake threshold is 15.

In step 232, the underperforming brake error counter is incremented by one. In step 234, the underperforming brake error counter is compared against an underperforming brake error count threshold. If the underperforming brake error counter is less than the underperforming brake error threshold, the method 220 continues to step 238. If the underperforming brake error counter is greater than or equal to the underperforming brake error threshold, the method 220 continues to step 236, where a fault is logged.

If the underperforming brake error counter has not exceeded the underperforming brake threshold in step 234, the control logic 21 continues to step 238 and determines if an underperforming brake time period from the initiation of the underperforming brake monitoring step 222 has elapsed. If the underperforming brake monitoring time period has elapsed, the error counter is reset to zero in step 239. This function compensates for noise on any wheel speed signal that may cause errors in the measurement or integration. If the underperforming brake time period has not elapsed, the method 220 returns directly to step 222 to continue to compare all wheel speed signals to the master value. In one example, the underperforming brake time period ranges from about ten (10) minutes to about fifteen (15) minutes.

Once an underperforming brake fault is determined using method 220, the wheel end with the underperforming brake can be given more brake pressure by the tractor controller 22 via the brake control device 34a, 34b, 34c, 34d in order to maintain the stability of the vehicle.

Figure 6:
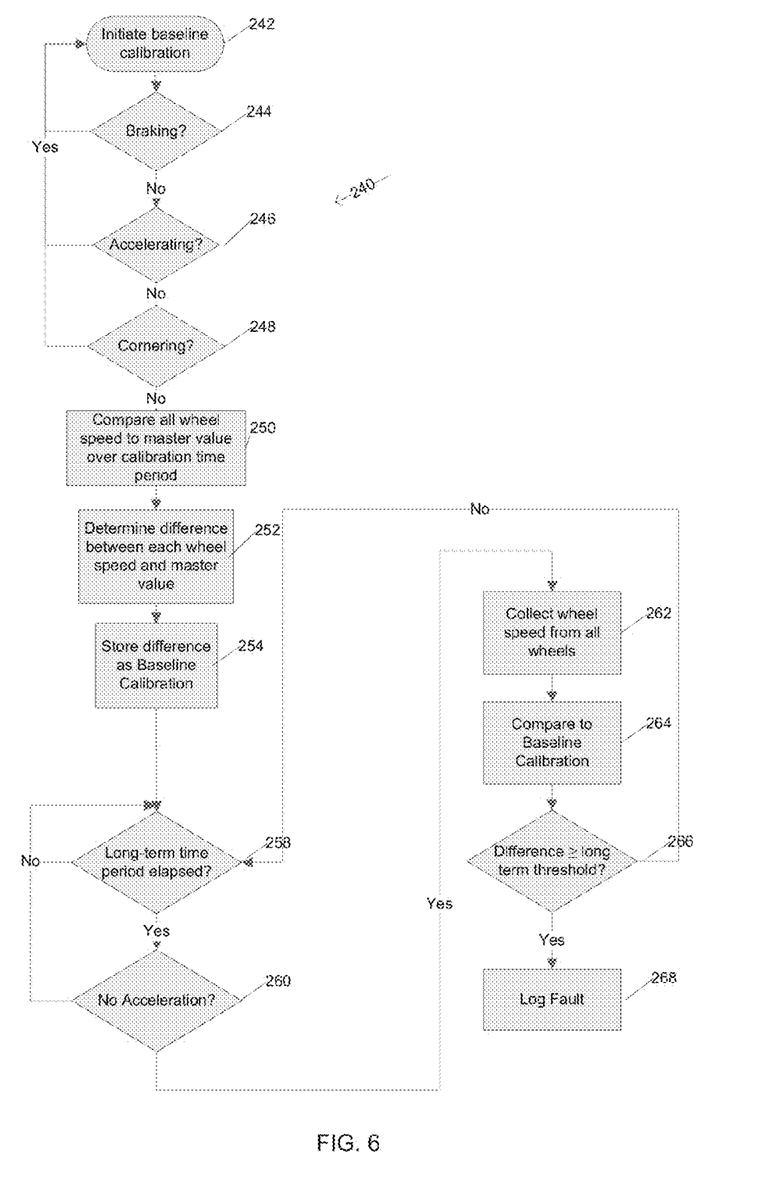
FIG. 6 illustrates another method of implementing the brake monitoring system, according to an example of the present invention.

In the example in FIG. 6, a long-term monitoring method 240 is shown. In step 242, the baseline calibration is initiated. The control logic 21 determines if the vehicle 10 is braking in step 244 by determining if there is a brake demand signal from the brake pedal 24. If there is no brake demand signal, the method 240 proceeds to step 246. If there is a brake demand signal, the method 220 returns to step 242. In step 246, the control logic 21 determines if the vehicle 10 is accelerating, either by using the signals from the wheel speed sensors 14a, 14b, 14c, 14d or other indicators of acceleration on the serial communications bus 42. If the vehicle 10 is not accelerating, the method 240 continues to step 248. If the vehicle 10 is accelerating, the method 240 returns to step 242. In step 248, the control logic 21 determines if the vehicle 10 is cornering, either by using the signal from the steering angle sensor 30 or other indicators of cornering. If the vehicle 10 is not cornering, the method 220 continues to step 250. If the vehicle 10 is cornering, the method 240 returns to step 242.

The method 240 continues to step 250 where the control logic 21 compares each of the individual wheel speed signals to the master value, already determined as per method 100, for a calibration time period equal to the initiation time period for the master value as completed as in method 100. The difference between each wheel speed and the master value is determined in step 252. The difference of each wheel speed signal from the master value is stored as a series of numbers in memory for use as the baseline calibration in step 254.

Once the baseline calibration is stored in step 254, the long-term monitoring method is initiated in step 256. The control logic 21 determines if a long-term time period has elapsed in step 258, meaning it has been a predetermined time since the last brake demand signal indicating braking of the vehicle 10 was received. If the long-term time period has elapsed, the method continues to step 260. If the long-term time period has not elapsed, the method returns to step 256. In one example, the long-term time period ranges from about 20 minutes to 60 minutes. In another example, the long-term time period is about 30 minutes.

In step 260, the control logic 21 determines if the vehicle 10 is accelerating, either by using the signals from the wheel speed sensors 14a, 14b, 14c, 14d or other indicators of acceleration on the serial communications bus 42. If the vehicle 10 is not accelerating, the method 240 continues to step 262. If the vehicle 10 is accelerating, the method 240 returns to step 258.

In step 262, all of the wheel speed signals are collected for the same period of time as the calibration time period. In step 264, the wheel speed signals are compared to the baseline calibration as stored in step 254. If the difference at any point in the comparison of the baseline calibration to a wheel speed signal is greater than or equal to long-term threshold as in step 266, the method continues to step 268. If each of the differences between the baseline calibration and the wheel speed signal over the calibration time period is less than the long-term threshold, the method 240 returns to step 256. In one example, the long-term threshold is about 10. In another example, the long-term threshold is about 20.

In step 268, a long-term fault is logged when the difference between the baseline calibration and any individual wheel speed signal is greater than the long-term threshold.

A similar method for monitoring brake operation can be done in the trailer controller 23 if the trailer controller 23 is equipped with anti-lock braking and stability control functions. The trailer controller 23 would determine its own master value using a method similar to method 100 and also perform a short-term monitoring method, drag monitoring method, underperforming brake monitoring method and long-term monitoring method similar to those described above.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method of monitoring brake operation on a vehicle comprising:
   receiving a brake demand signal indicative of a brake demand;
   receiving at least one stability signal of the vehicle;
   receiving a plurality of wheel speed signals from individual wheel speed sensors associated with individual wheel ends of the vehicle;
   determining a master value based on the plurality of wheel speed signals over an initiation time period for comparison with the plurality of wheel speed signals;
   determining the velocity of the vehicle is equal to or greater than a predetermined minimum velocity;
   determining the vehicle is not being controlled by an active safety system;
   determining the brake demand signal is greater than a predetermined minimum braking threshold and less than a predetermined maximum braking threshold;
   selecting a wheel speed signal having the lowest velocity of the plurality of wheel speed signals when the brake demand is no longer present;
   calculating the difference in the selected wheel speed signal from the master value, wherein a predetermined short-term time period has not elapsed;
   calculating an integrated difference;
   incrementing an error counter by one increment when the integrated difference is greater than a short-term threshold to arrive at an accumulated brake drag count;
   determining a brake drag fault exists at the wheel end associated with the selected wheel speed signal when the accumulated brake drag count is greater than an error count threshold and the predetermined short-term time period has not elapsed; and
   transmitting a brake control signal at the output to the at least one brake control device to reduce the pressure at the wheel end associated with the brake drag fault.

2. The method as in claim 1, wherein determining a master value occurs in response to the acceleration of the vehicle being about zero, the brake demand signal indicating no braking, and the at least one stability signal indicating no cornering.

3. The method as in claim 1, wherein the master value comprises one of: the average of the plurality of wheel speed signals, the mode of the plurality of wheel speed signals, and the vehicle speed as determined by a controller on the vehicle.

4. The method as in claim 1 further comprising: determining a baseline calibration of each of the individual wheel speed signals as a function of the master value, wherein determining the baseline calibration comprises comparing each of the individual wheel speed signals individually to the master value for a calibration time period and storing the difference between each of the individual wheel speed signals and the master value as the baseline calibration for each of the individual wheel speed signals.

5. The method as in claim 1 further comprising:
   resetting the accumulated brake drag counter to zero after the expiration of the short-term time period.

6. The method as in claim 1 wherein the error count threshold ranges from about 3 to about 10.

7. The method as in claim 1, wherein the predetermined minimum velocity is about ten miles per hour.

8. The method as in claim 1 further comprising:
   comparing a temperature signal from a tire sensor to a predetermined tire temperature threshold, the tire sensor located at the wheel end associated with the wheel speed signal which has an integrated difference greater than the short-term threshold; and
   determining a brake drag fault exists in response to the tire temperature exceeding the predetermined tire temperature threshold and the error counter exceeding a predetermined count.

9. The method as in claim 1, further comprising:
   Calculating a difference of each individual wheel speed signal from the master value over a calibration time period;
   Determining if a long-term time period has elapsed since the brake demand signal indicated braking;
   Calculating a difference of each individual wheel speed signal from the master value over a second time period equal to the calibration time period wherein the long-term time period has elapsed;
   Comparing the difference to a long-term threshold; and
   determining a long-term fault exists when the difference is greater than or equal to the long-term threshold.

10. The method as in claim 9 wherein the long-term time period is between about twenty minutes and about sixty minutes.

11. A controller for monitoring brake operation of a vehicle comprising:
    a plurality of wheel speed inputs for receiving individual wheel speed sensor signals, each of the plurality of wheel speed inputs correlated with a specific wheel location;
    a brake demand input;
    a plurality of stability sensor inputs for receiving stability signals;
    a communication port for receiving and transmitting a plurality of messages on a serial communications bus;
    an output for communicating a brake signal to at least one brake control device; and
    a processing unit comprising control logic, wherein the processing unit is in communication with the plurality of wheel speed inputs and the communication port, the control logic capable of:
    receiving a brake demand signal indicative of a brake demand;
    receiving at least one stability signal indicative of the cornering of the vehicle;
    receiving signals from a plurality of wheel speed signals;
    determining a master value for comparison with the plurality of wheel speed signals;
    selecting a wheel speed signal having the lowest velocity of the plurality of wheel speed signals when a brake demand is not present;

calculating the difference in the selected wheel speed signal from the master value, wherein a short-term time period has not elapsed;

calculating an integrated difference;

incrementing an error counter by one increment when the integrated difference is greater than a short-term threshold to arrive at an accumulated brake drag count;

determining a brake drag fault exists at the wheel end associated with the selected wheel speed signal when the accumulated brake drag count is greater than an error count threshold and the short-term time period has not elapsed; and transmitting a brake control signal at the output to the at least one brake control device to reduce the pressure at the wheel end associated with the brake drag fault.

12. The controller as in claim 11, wherein the determining a master value occurs in response to the acceleration of the vehicle being about zero, the brake demand signal indicates no braking and the at least one stability signal indicate no cornering.

13. The controller as in claim 11, wherein the master value comprises one of the average of the plurality of wheel speed signals, the mode of the plurality of wheel speed signals, and the vehicle speed as determined by a controller on the vehicle.

14. The controller as in claim 11 wherein the stability signal is received from at least one of a lateral acceleration sensor, a yaw rate sensor and a steering angle sensor.

15. The controller as in claim 11, wherein the control logic is further capable of:

determining a baseline calibration of each of the individual wheel speed signals as a function of the master value, wherein determining the baseline calibration comprises comparing each of the individual wheel speed signals individually to the master value for a calibration time period and storing the difference between each of the individual wheel speed signals and the master value as the baseline calibration for each of the individual wheel speed signals.

16. The controller as in claim 11 wherein the predetermined short-term time period ranges from about five minutes to about ten minutes.

17. The controller as in claim 11 wherein determining a master value comprises determining an individual wheel speed signal as one that is equal to an overall vehicle velocity as determined by a source other than the wheel speed sensor signals.

18. The controller as in claim 17, wherein the source other than the wheel speed sensor signals is a vehicle velocity as determined by one of an engine controller, a radar controller and the anti-lock brake controller.

19. The controller as in claim 11, wherein the control logic is further capable of performing at least one of anti-lock braking and stability control functions.

20. The controller as in claim 11, further comprising an indicator output to inform an operator of a brake drag fault at the wheel end associated with the selected wheel speed signal, wherein the control logic is further capable of transmitting a signal to the indicator output to inform an operator of a brake drag fault at the wheel end associated with the brake drag fault.

21. A controller for monitoring brake operation of a vehicle comprising:

control logic, wherein the controller is in communication with a plurality of wheel speed sensors, at least one stability sensor and at least one brake demand sensor, the control logic capable of:

receiving a brake demand signal from the at least one brake demand sensor indicative of a brake demand;

receiving at least one stability signal from the at least one stability sensor indicative of the cornering of the vehicle;

receiving wheel speed sensor signals from the plurality of wheel speed sensors;

determining a master value from the plurality of wheel speed signals when the brake demand signal indicates no braking and wherein the at least one stability signal indicates no cornering;

calculating a difference of each individual wheel speed signal from the master value when the brake demand signal indicates no braking;

calculating an integrated difference of each individual wheel speed signal from the master value;

comparing each integrated difference to a short-term drag threshold;

incrementing an error counter when the integrated difference of one of the plurality of individual wheel speed signals is greater than the short-term drag threshold; and determining a short-term brake drag fault exists in response to the error counter exceeding a predetermined error count; and controlling at least one brake control device to reduce the pressure at the wheel end associated with the short-term brake drag fault.

* * * * *